United States Patent
Brahmbhatt et al.

(10) Patent No.: US 6,290,857 B1
(45) Date of Patent: Sep. 18, 2001

(54) METHOD FOR OXYGENATION OF WASTE WATER

(75) Inventors: Sudhir R. Brahmbhatt, Glencoe, MO (US); J. Michael Forde, Orange Park, FL (US)

(73) Assignee: MG Industries, Malvern, PA (US)

( * ) Notice: Subject to any disclaimer, the term of this patent is extended or adjusted under 35 U.S.C. 154(b) by 0 days.

(21) Appl. No.: 09/488,105

(22) Filed: Jan. 20, 2000

(51) Int. Cl.$^7$ ........................................... C02F 1/72
(52) U.S. Cl. .................. 210/758; 210/621; 210/765; 261/77; 261/121.1; 261/DIG. 70
(58) Field of Search .................. 210/620, 621, 210/622, 627, 629, 758, 220, 195.1, 221.2, 765; 261/77, 121.1, DIG. 70

(56) References Cited

U.S. PATENT DOCUMENTS

| | | | | |
|---|---|---|---|---|
| 3,477,947 | * | 11/1969 | Kappe ................................ | 210/194 |
| 3,607,735 | * | 9/1971 | Hover et al. ...................... | 210/220 |
| 3,853,764 | * | 12/1974 | Armstrong ......................... | 210/202 |
| 3,957,633 | * | 5/1976 | Gatti et al. ........................ | 210/220 |
| 4,002,561 | * | 1/1977 | Traverse ............................ | 210/220 |
| 4,156,650 | * | 5/1979 | Garrett .............................. | 210/194 |
| 5,314,622 | * | 5/1994 | Stirling ............................. | 210/629 |

* cited by examiner

Primary Examiner—Peter A. Hruskoci
(74) Attorney, Agent, or Firm—William H. Eilberg

(57) ABSTRACT

Oxygen is mixed with waste water at an early stage in a water treatment facility, to reduce odor caused by anaerobic reactions of sulfur. Waste water is withdrawn from a collection basin, by a pump connected to a suction pipe, and is mixed with oxygen from an external source. The mixture, having been saturated with oxygen, is then returned to the collection basin through a discharge pipe. The end of the discharge pipe is positioned at a higher vertical level than the end of the suction pipe, to prevent gas from entering the pump which would cause cavitation. Also, the end of the discharge pipe has a blind flange, such that the oxygen-enriched water exiting the discharge pipe flows in a direction which is non-parallel to the axis of the pipe. This arrangement provides better mixing of the oxygen with the water in the basin, and prevents the oxygen-enriched water from flowing too soon to the suction pipe. The invention substantially improves the efficiency and efficacy of waste water treatment, because it provides an economical way to oxygenate the waste water at an early stage in the treatment process.

5 Claims, 4 Drawing Sheets

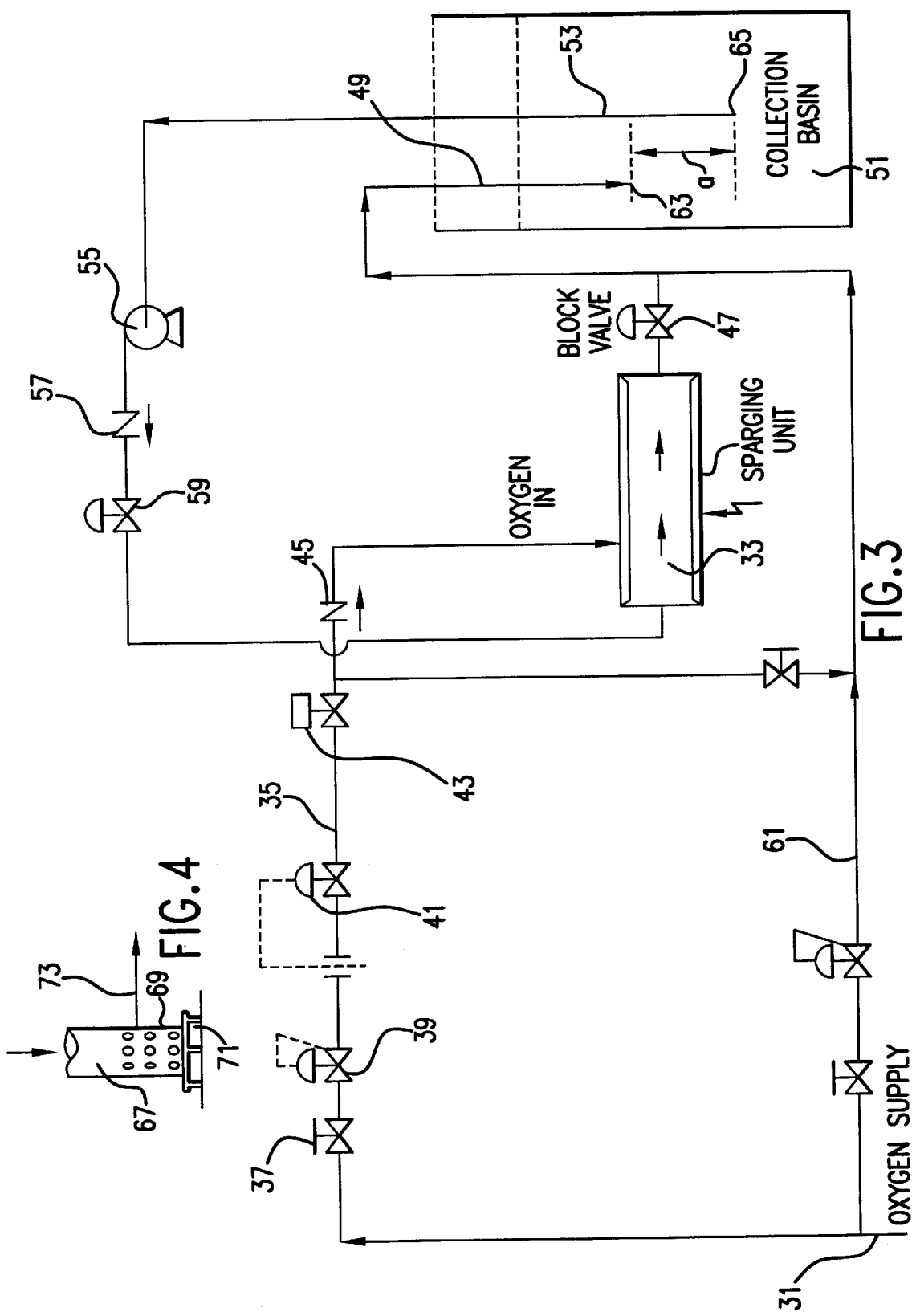

METHOD FOR OXYGENATION OF WASTE WATER

The present invention relates to the field of waste water treatment, and provides a system and method for oxygenating waste water at an early stage of the waste water treatment process.

In a typical waste water treatment facility, waste water is collected from various sources, including residential and/or industrial sources. The waste water from these sources is initially held in a collection basin, also known as a diversion box. The water is then conveyed to one or more settling tanks, wherein debris in the water is allowed to settle. The water can then be filtered one or more times, aerated, and treated with chemicals such as ozone, chlorine, etc. There may be one or more further collection basins positioned before the first filtration stage.

Bacteria in the water attack organic material in the water, consuming oxygen in the process. But since the water reaching the collection basin is delivered through underground conduits, the supply of oxygen in the water is limited. If there is insufficient oxygen available to support the reactions which would naturally occur in the presence of oxygen, anaerobic reactions take place instead. Such reactions typically include the chemical combination of sulfur with hydrogen to produce hydrogen sulfide, a very odorous gas. Elimination of foul odors, and promoting biological oxidation reactions, are major concerns in the field of waste water treatment.

The known solution to the above-described problem is to oxygenate the water. When the deficiency of dissolved oxygen is overcome, the odor problem is greatly reduced or eliminated.

It has therefore been proposed, in the prior art, to provide a source of pure oxygen at high pressure, to dissolve this oxygen in a sample of the waste water, and to return the oxygenated sample to the basin being treated.

One prior art arrangement for performing the above steps is shown in FIG. 1. Oxygen from a supply (not shown) flows into conduit 1, through valve 3, and into mixing device 5. Waste water located in collection basin 7 is drawn out by pump 11, through suction pipe 9, and sent to the mixing device. The mixture of oxygen and waste water is then introduced into the collection basin through discharge pipe 13. The discharge pipe is connected to a plurality of nozzles 15 located at or near the bottom of the collection basin.

The major problem with the method described above is that the nozzles easily become clogged with debris which is almost always present in the waste water.

Another proposed solution of the prior art is shown in FIG. 2. In this embodiment, the nozzles have been eliminated. Instead, the ends of discharge pipe 21 and suction pipe 23 are displaced from the bottom of the basin. In the example given in the figure, these ends are positioned about midway between the top and bottom of the basin. In this embodiment there are two oxygen lines, one of which is used as a backup in the event that the pump 27 becomes clogged or in the event that cavitation renders the pump ineffective. Also in this embodiment, a screen (not shown) is used at the inlet to suction pipe 23, to prevent debris in the water from interfering with the operation of pump 27.

The system described above is still not practical. Its major problem is that it causes cavitation in the pump. As the screen becomes clogged, the pump has less and less to pull, resulting in reduced suction in the line. Changes in pressure in the line may cause oxygen to come out of solution, and if this occurs, the pump will tend to pull both gas and water out of the basin. The presence of gas in the line causes damage to the pump.

The present invention provides a system and method which allows the oxygenation of waste water in a collection basin, but which nevertheless does not suffer from the disadvantages of the prior art described above.

SUMMARY OF THE INVENTION

The present invention comprises a system which connects a source of pressurized oxygen to a mixing device. A pump draws some of the waste water out of a collection basin, and directs this water to the mixing device, where the water and oxygen are mixed so that the oxygen is dissolved in the water. This oxygen-enriched water produced in the mixing device is conveyed to a discharge pipe, the end of which sits within the waste water in the basin. A suction pipe, connected to the pump, withdraws a portion of the contents of the basin. The ends of the discharge pipe and the suction pipe are at different vertical levels. In the preferred embodiment, the end of the discharge pipe is located above the end of the suction pipe. In operation, water is continuously withdrawn from the basin, while oxygen-enriched water is continuously injected into the basin.

The end of the discharge pipe preferably includes a blind flange, which tends to prevent returned waste water from flowing directly out of the discharge pipe. Instead, the oxygen-water mixture is directed out of the discharge pipe, through holes in its side wall, in a direction which is non-parallel to the longitudinal axis of the pipe. This arrangement assures that the mixture will not directly enter the suction pipe, but will instead become evenly dispersed through the basin. Thus, the suction pipe does not "short-circuit" the discharge pipe.

The invention therefore also includes the method of oxygenating the contents of a waste water collection basin by mixing some of the waste water with oxygen, such that the oxygen becomes dissolved in the water, and introducing the oxygen-enriched water into the basin at a vertical level different from that at which water in the basin is removed. The introducing step is performed by introducing the mixture in a direction which is generally perpendicular, or at least non-parallel, to the flow of fluid in the discharge pipe.

The present invention virtually eliminates the cavitation problem associated with systems of the prior art, making it feasible to oxygenate waste water at an early stage of its processing.

The present invention therefore has the primary object of providing a system and method for oxygenation of waste water.

The invention has the further object of preventing cavitation in a pump used to draw waste water from a collection basin, for use in an oxygenation process.

The invention has the further object of reducing or eliminating foul odors in a collection basin in a waste water treatment facility.

The invention has the further object of oxygenating waste water at a relatively early stage in a waste water treatment plant.

The invention has the further object of improving the efficiency and effectiveness of waste water treatment.

The reader skilled in the art will recognize other objects and advantages of the present invention, from a reading of the following brief description of the drawings, the detailed description of the invention, and the appended claims.

BRIEF DESCRIPTION OF THE DRAWINGS

FIG. 3 provides a schematic diagram of the system of the present invention.

FIG. 4 provides a fragmentary elevational view of the end of the discharge pipe used in the present invention.

DETAILED DESCRIPTION OF THE INVENTION

Figure 1:
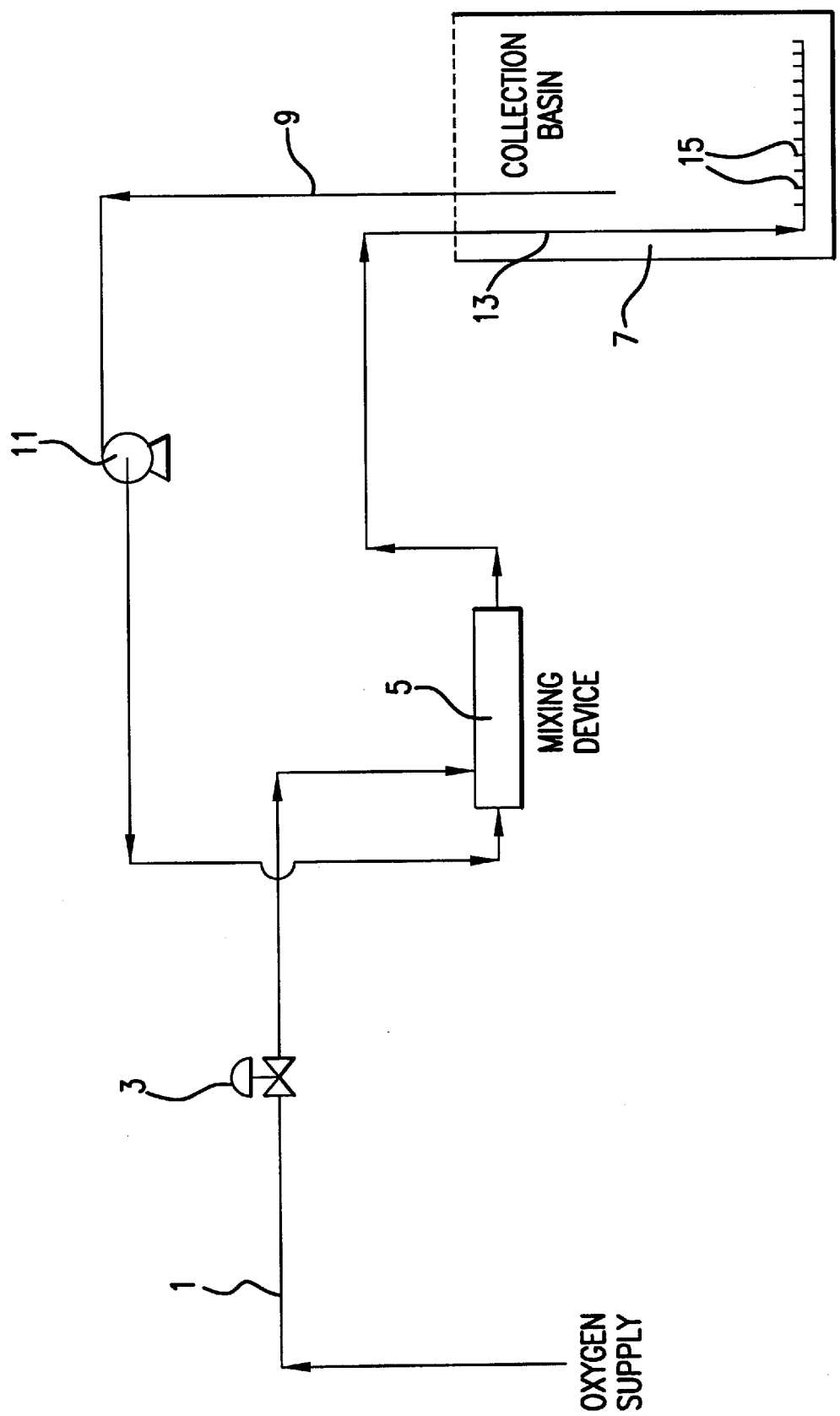
FIG. 1 provides a schematic diagram of a system of the prior art, for oxygenating waste water in a collection basin.

FIG. 3 provides a schematic diagram of the system of the present invention. Oxygen from a supply (not shown) flows into the system through conduit 31. The oxygen is preferably at a high pressure, typically 150 psig. The oxygen flows to sparging or mixing unit 33 through conduit 35, which includes manual blocking valve 37, pressure regulator 39, flow control valve 41, solenoid valve 43, and check valve 45. The solenoid valve is intended to close in the event of an emergency. The contents of the mixing unit pass through blocking valve 47, and then through discharge pipe 49 which terminates in collection basin 51.

Suction pipe 53 also has an end terminating in the collection basin, and is connected to pump 55. The output of the pump passes through check valve 57, blocking valve 59, and then to mixing unit 33. The blocking valves allow portions of the system to be isolated for maintenance.

The pump is preferably a self-priming pump. In one embodiment, the pump may have a capacity of about 600 gallons per minute. Pumps having a capacity greater or less than 600 gpm can be used, depending on the size of the system. The invention is not limited to a specific capacity.

An oxygen bypass line 61 provides an alternate path for oxygen in the event of cavitation in the pump, or if the pump becomes inoperative for some other reason.

The end 63 of the discharge pipe is displaced vertically relative to the end 65 of the suction pipe. In the preferred embodiment, the end of the discharge pipe is positioned above the end of the suction pipe. This vertical displacement is represented by reference symbol "a" in FIG. 3. In one example, the value of "a" may be about two feet. The latter dimension is given only as an example, and is not intended to limit the invention. The optimum height difference between the two pipes may be affected by other factors, such as the flow rate of the water, the amount of oxygen dissolved, and the size of the basin.

The discharge pipe and the suction pipe should be spaced sufficiently close that the oxygen remains in the main flow stream, but sufficiently far apart that the oxygen does not "short-circuit", i.e. that it does not enter the suction pipe before having spent any time in the basin. It is important that the oxygen remain in flowing water; the oxygen will not serve the desired purpose in stagnant water. The residence time of the oxygen in the water is short, and if the oxygen is not used immediately, it will not be effective in supporting the desired chemical reactions.

In operation, water from the basin is withdrawn continuously through the suction pipe, and the oxygen-enriched water from the mixing unit is continuously conveyed into the basin through the discharge pipe. Due to the action of the pump, these steps are performed simultaneously.

Positioning the ends of the discharge pipe and the suction pipe at different heights tends to prevent gas from entering the suction pipe, thus preventing cavitation in the pump. The oxygen mixed with the water is dissolved in the water before it reaches the suction pipe, and thus there is no gas to cause cavitation. Moreover, the use of water containing dissolved oxygen provides the conditions necessary to reduce or eliminate foul odors in the water.

FIG. 4 shows the preferred structure of the end of the discharge pipe. The discharge pipe includes cylindrical body 67 having holes 69 formed in the side wall of the body. The pipe also includes blind flange 71 which is offset from the end of the pipe. That is, an opening is formed between the end of the discharge pipe and the blind flange. Thus, the blind flange inhibits the flow of fluid directly out of the end of the discharge pipe. Some of the fluid in the discharge pipe will flow out through the holes 69, and some of the fluid will be diverted by the blind flange, and will flow out through the opening between the end of the discharge pipe and the blind flange. In either case, fluid exits the discharge pipe in a direction indicated by arrow 73, which is generally perpendicular, or at least non-parallel, to the longitudinal axis of the pipe, which is the direction of flow of fluid in the pipe. This arrangement tends to prevent gas from entering the suction pipe before it is further mixed with the waste water.

The use of the discharge pipe having the structure shown in FIG. 4 further helps to mix the oxygen more thoroughly with the waste water, as the waste water and oxygen mixture is directed laterally through the collection basin, and not directly to the area of the suction pipe. Also, the fact that the ends of the discharge pipe and suction pipe are vertically displaced from each other further reduces the "short-circuiting" effect wherein water tends to flow out of the discharge pipe and directly into the suction pipe. Proper treatment of the waste water requires that the oxygen be mixed uniformly through the basin. The present invention accomplishes this aim in a practical and efficient manner.

Figure 2:
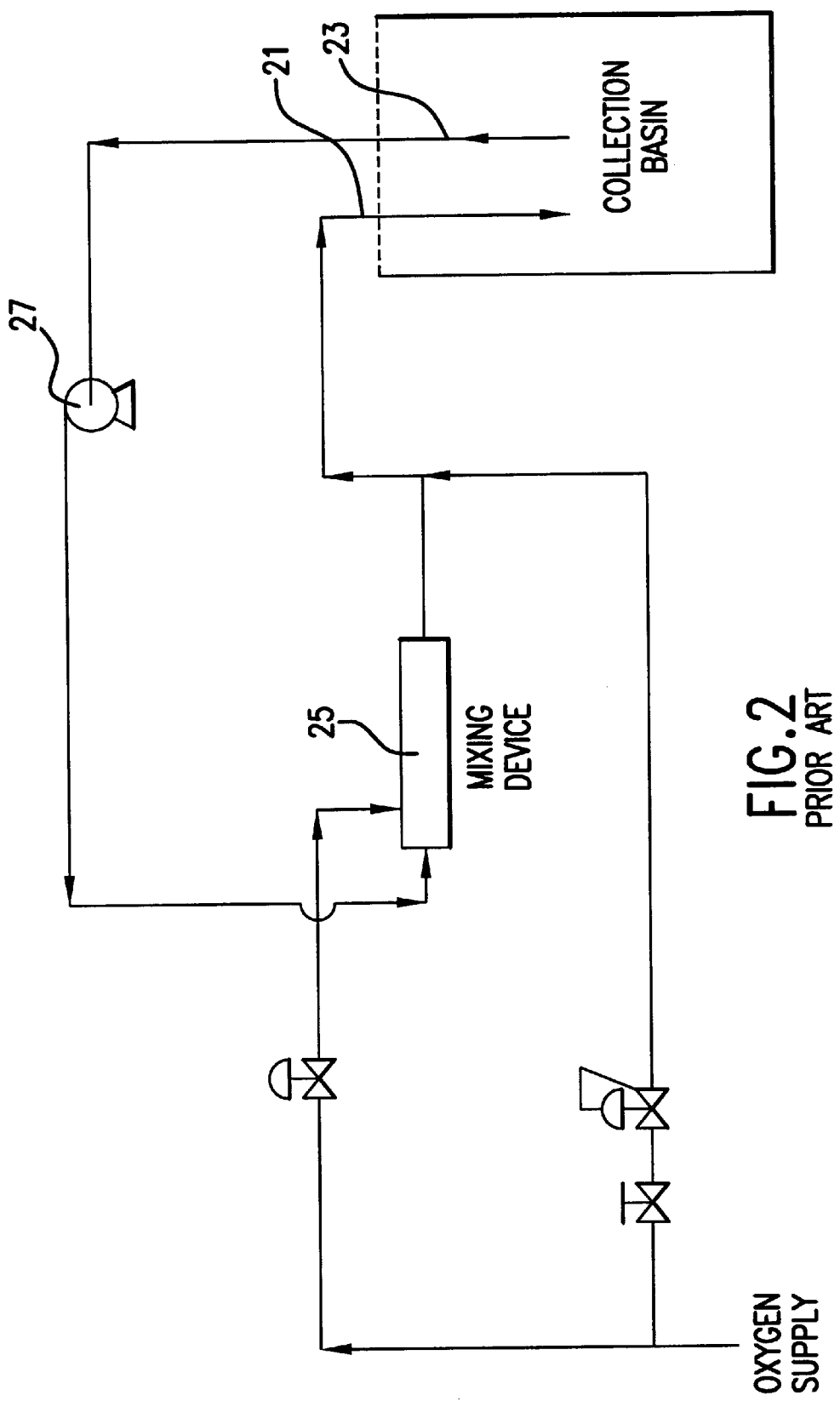
FIG. 2 provides a schematic diagram of another system of the prior art, for oxygenating waste water.

In the prior art system of FIG. 2, a screen was used on the inlet to the suction pipe to prevent debris from reaching the pump. Experience with the arrangement of FIG. 2 has shown that the screen itself becomes quickly clogged with debris. In the present invention, there is no such screen. One can select the size of the pump so as to handle debris of a given size. The risk to the pump comes from cavitation, but, as explained above, the present invention reduces or eliminates this risk.

Figure 5:
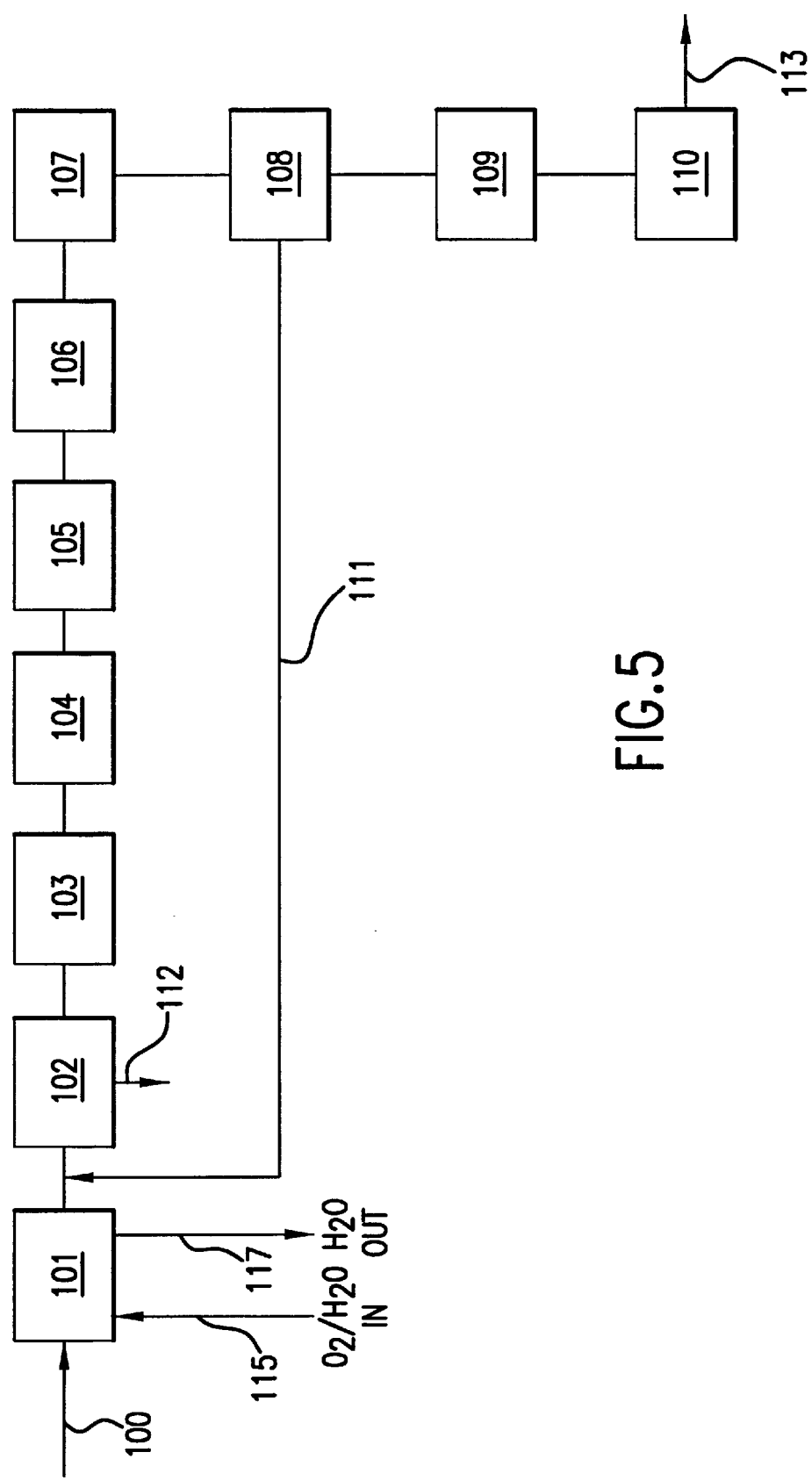
FIG. 5 provides a block diagram of a typical waste water treatment facility using the method of the present invention.

FIG. 5 provides a block diagram of a typical waste water treatment facility, as modified according to the present invention. This diagram shows the stages of the system, and the steps of the method, for treating the waste water.

Waste water enters through conduit 100, and flows into primary diversion box (or basin) 101. Debris settles out of the water in primary settling tank 102. Sludge from this tank exits through line 112. There may be a plurality of primary settling tanks, in which case such tanks would be connected in parallel. The water then flows into a first stage trickling filter diversion box 103. The water is then filtered in trickling filter 104, which could also comprise a plurality of filters connected in parallel. The filtered water passes to trickling filter conversion box 105, and into tertiary settling tank 106. As before, tank 106 could be replaced by a plurality of tanks connected in parallel.

Next, the water flows to tertiary aeration tank 107, and to final diversion box 108. Sludge from diversion box 108 is recycled, through line 111, to the primary settling tank 102. In intermediate diversion box 109, the water is treated with chlorine, and the treated water flows into intermediate tank 110 (which could comprise more than one tank connected in parallel) and out of the system through line 113.

FIG. 5 also illustrates, schematically, the injection of the oxygen-enriched water, through line 115, and the withdrawal of water from the basin, through line 117, as described earlier.

In the embodiment shown, oxygen is mixed with the water in diversion box (or collection basin) 101, which comprises the first major step of the water treatment process. Oxygen could also be injected at later points in the process.

The present invention is believed to be the first practical system for oxygenation of waste water in a collection basin. In the prior art, it has been known to oxygenate waste water, but only at later stages in the water treatment process, such as in aeration basins positioned considerably downstream of the waste water intake. By effectively oxygenating waste water in a collection basin, i.e. at or near the point where the waste water first enters the system, and in any case before the first significant filtration or treatment step, one greatly improves the efficiency of the water treatment process.

The invention can be modified in various ways. The specific arrangement of blocking valves and pressure regulators can be varied according to the needs of the user. The specific shape of the collection basin may vary. The invention is not limited by the particular structure of the mixing unit or of the pump. These and other similar modifications will be apparent to the reader skilled in the art, and should be considered within the spirit and scope of the following claims.

What is claimed is:

1. A method of oxygenating waste water in a collection basin, the collection basin having a supply conduit for supplying waste water to the collection basin, the method comprising:
    a) withdrawing waste water from the collection basin through a suction pipe which is free of any direct connection to said supply conduit, the withdrawing step being performed by a pump having a downstream side,
    b) mixing the waste water withdrawn in step (a) with oxygen to form oxygen-enriched water, the mixing step being performed on the downstream side of the pump, and
    c) injecting said oxygen-enriched water into the collection basin through a discharge pipe which is free of any direct connection to said supply conduit,
    wherein the injecting step and the withdrawing step are performed simultaneously at different vertical levels within the collection basin,
    wherein the discharge pipe has a longitudinal axis, and wherein the injecting step comprises directing the oxygen-enriched water out of the discharge pipe in a direction which is non-parallel to said longitudinal axis, and wherein the injecting step includes directing the oxygen-enriched water through a plurality of holes in the discharge pipe.

2. The method of claim 1, wherein the injecting step is performed at a higher vertical level than the withdrawing step.

3. A method of oxygenating waste water in a collection basin, the method comprising:
    a) withdrawing waste water from the collection basin,
    b) mixing the waste water withdrawn in step (a) with oxygen to form oxygen-enriched water, and
    c) injecting said oxygen-enriched water into the collection basin,
    wherein the injecting step comprises delivering the oxygen-enriched water to the collection basin through a straight conduit having a longitudinal axis, and directing the oxygen-enriched water out of the conduit in a direction which is non-parallel to said longitudinal axis, wherein the directing step is performed by directing the oxygen-enriched water through a plurality of holes in said conduit.

4. A method of oxygenating waste water in a collection basin, comprising:
    a) supplying waste water to the collection basin, through a supply conduit,
    b) pumping some of the waste water out of the collection basin,
    c) mixing the waste water pumped out of the collection basin in step (b) with oxygen, and returning oxygen-enriched waste water to the collection basin,
    wherein step (b) is performed by a pump having a downstream side, and
    wherein step (c) is performed on the downstream side of the pump,
    wherein the returning step includes passing the oxygen-enriched waste water through a discharge conduit having a longitudinal axis, and
    wherein the returning step includes passing the oxygen-enriched waste water through a plurality of holes in a wall of said discharge conduit in a direction which is non-parallel to said longitudinal axis.

5. The method of claim 4, wherein the pumping and returning steps include pumping and returning the waste water through conduits which are free of any direct connection with the supply conduit.

* * * * *